March 31, 1959 J. A. REYNOLDS ET AL 2,880,327

WALL EXPOSURE SAFETY CIRCUIT FOR RADIATION PROTECTION

Filed April 3, 1957 5 Sheets-Sheet 1

INVENTORS.
JOHN A. REYNOLDS
EDWARD SLAGLE
BY
Hyde, Meyer, Baldwin & Doran
ATTORNEYS

WALL EXPOSURE SAFETY CIRCUIT FOR RADIATION PROTECTION

Filed April 3, 1957 5 Sheets-Sheet 2

INVENTORS.
JOHN A. REYNOLDS
EDWARD SLAGLE
BY
Hyde, Meyer, Baldwin & Doran
ATTORNEYS

WALL EXPOSURE SAFETY CIRCUIT FOR RADIATION PROTECTION

INVENTORS.
JOHN A REYNOLDS
EDWARD SLAGLE
BY
Hyde, Meyer, Baldwin & Doran
ATTORNEYS March 31, 1959 J. A. REYNOLDS ET AL 2,880,327

WALL EXPOSURE SAFETY CIRCUIT FOR RADIATION PROTECTION

Filed April 3, 1957 5 Sheets-Sheet 4

INVENTORS.
JOHN A. REYNOLDS
EDWARD SLAGLE
BY
Hyde, Meyer, Baldwin & Doran
ATTORNEYS March 31, 1959 J. A. REYNOLDS ET AL 2,880,327

WALL EXPOSURE SAFETY CIRCUIT FOR RADIATION PROTECTION

Filed April 3, 1957 5 Sheets-Sheet 5

INVENTORS.
JOHN A. REYNOLDS
EDWARD SLAGLE
BY
Hyde, Meyer, Baldwin & Doran
ATTORNEYS United States Patent Office 2,880,327

Patented Mar. 31, 1959

2,880,327

WALL EXPOSURE SAFETY CIRCUIT FOR RADIATION PROTECTION

John A. Reynolds, White Plains, N.Y., and Edward Slagle, South Euclid, Ohio, assignors to Picker X-Ray Corporation, Waite Manufacturing Division, Inc., Cleveland, Ohio, a corporation of Ohio Application April 3, 1957, Serial No. 650,492

13 Claims. (Cl. 250—95)

This invention relates to high energy ray apparatus and has particular reference to safety arrangements for preventing overdosage when handling equipment of this type for therapeutical purposes.

The penetrating radiation from radioactive materials such as cobalt 60, or from high energy X-rays, has a destructive effect upon living tissue in proportion to the intensity of the radiation and the time of exposure. Various codes of suggested "maximum permissible dosages" have been established to guide those who are working in areas where they may be exposed to radiation of this sort. In general, such codes specify the amount of radiation to which any individual may be exposed during a period of one week, on the assumption that such doses are repeated each week during the working life of the individual. Since it is difficult to measure the "dosage" of radiation which any individual may happen to receive during a week from a particular installation of a radioactive source, it becomes necessary to insure that the total amount of the radiation in the areas where people may be present shall be reduced to a sufficiently low value that it would be virtually impossible for anyone remaining in those areas for a maximum number of hours weekly to receive more than the maximum permissible dosage for a week. Thus, it becomes necessary to protect areas rather than people and the calculation of protection provided against radiation through the walls of a room containing a cobalt 60, or other, source is based on the assumption that a person will be on the outside of a particular wall for forty hours a week or some fraction thereof, depending upon the way in which that particular area is utilized.

An object of the present invention then, consists in providing an arrangement which prevents accidental errors and which especially prevents overdosages of high energy penetrating radiation due to mistakes of commission or omission by the operator, thereby cutting down the risk of causing accidental damage to individuals.

Another object of the present invention is to provide circuits associated with the high energy ray controlling means which accurately time the exposure to each wall, rather than actually measure the radiation falling on each wall since the radiation from a cobalt 60, or other source, is essentially constant in intensity.

Still another object of the present invention consists in providing circuits associated with a high energy ray machine to be used during therapy treatment which prevent the use of the machine when it is directed toward a wall which has already received a maximum predetermined time of exposure in any given week.

A further object of the present invention is to include timing means in the circuits associated with the high energy ray machine which accurately measures the time the machine is used in any of several directions in such a way that the radiation preventing means circuit which covers a particular direction is operative only when the maximum time of exposure for said one direction has been consumed.

A further object of this invention is to provide an apparatus that will automatically terminate any possibility of exposure when the proper quantity of radiation has been emitted in a particular direction.

A still further object of the present invention is to provide a safety device for controlling total permissible radiation in a predetermined direction from a beam of rays from a high energy ray source comprising a timer, means energizing said timer only when said beam of rays is directed in said predetermined direction, means normally enabling said source and actuatable to a disabling condition, together with means responsive to operation of said timer for a predetermined period for causing actuation of said source enabling means to said disabling condition.

Another object of the present invention is to provide a safety device for high energy ray machines which is simple in construction and operation and which can be cheaply and easily manufactured. Other features of this invention reside in the arrangement and design of the parts for carrying out their appropriate functions.

Further objects of the present invention and certain practical advantages will be referred to in or will be evident from the following description of two embodiments of the invention, as illustrated in the accompanying drawings, in which Fig. 1 is a diagrammatic plan view of a room containing a high energy ray machine which incorporates a cobalt 60 source.

Before describing in detail the hereinafter disclosed embodiments of the invention, it is to be understood that the present invention is not limited to the structural details or the particular arrangement of parts herein shown, as devices embodying the present invention may take other forms. It also is to be understood that the phraseology and terminology herein used are for purposes of description and not of limitation, as the scope of the present invention is denoted by the appended claims.

Figure 1:
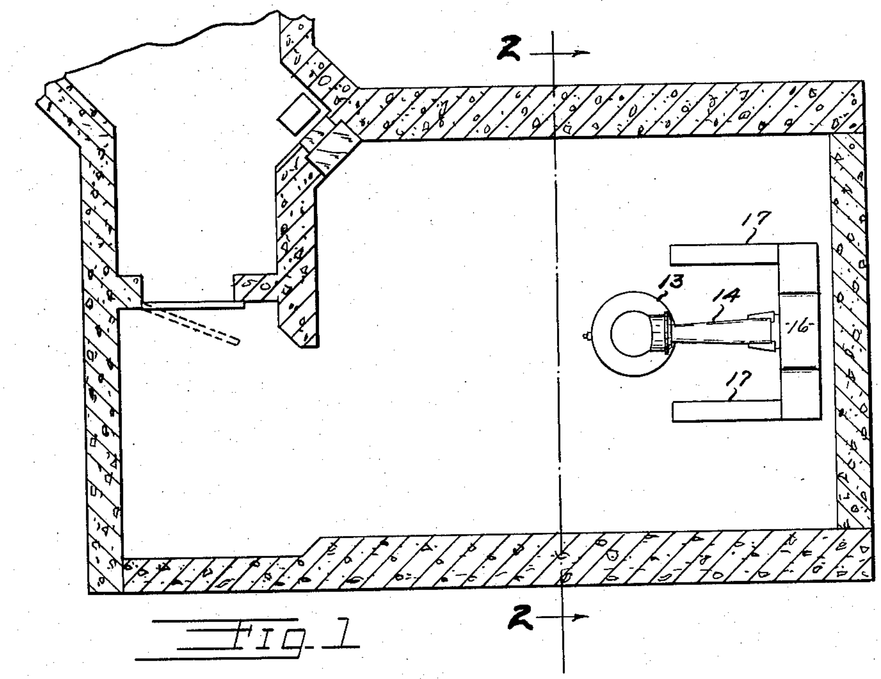
Figure 2:
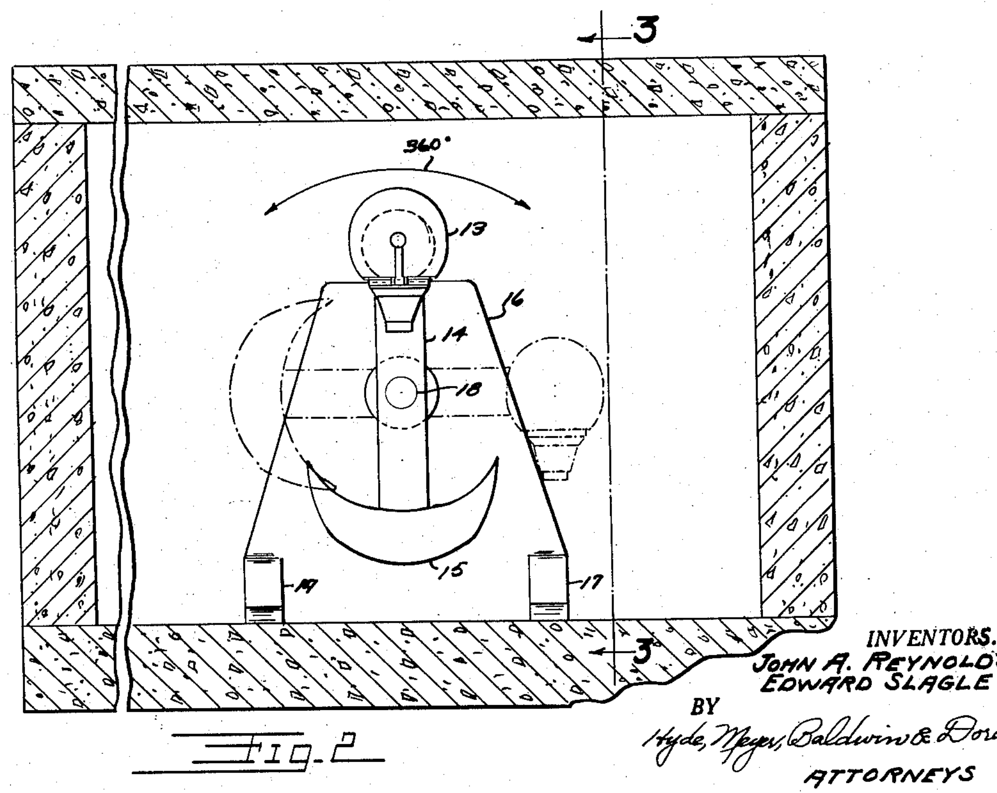
Fig. 2 is a vertical sectional view taken along the plane of line 2—2 of Fig. 1 and showing the front elevation of the high energy ray machine.
Figures 3, 4:
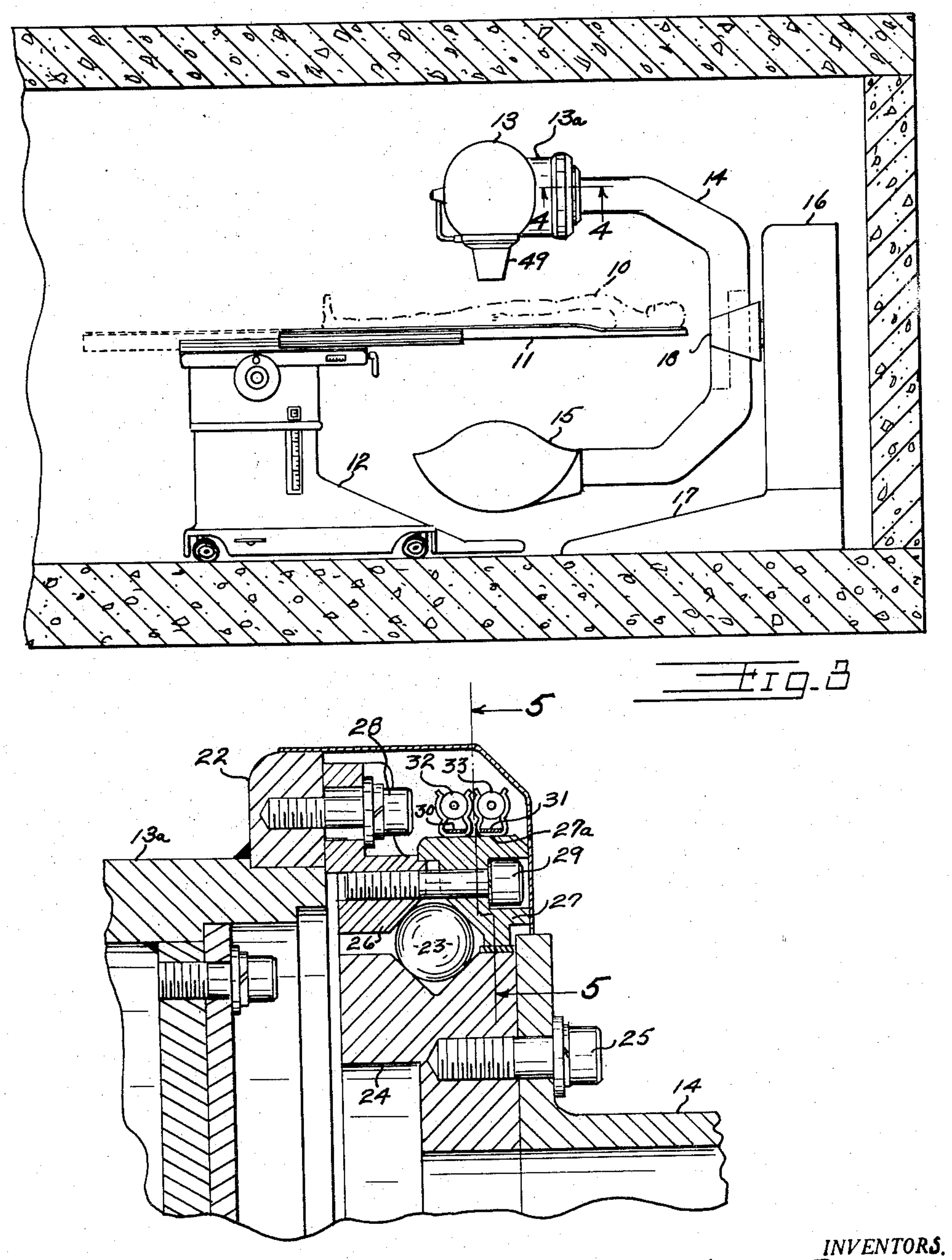
Fig. 3 is a vertical sectional view taken along the plane of line 3—3 of Fig. 2 and showing a side elevational view of the high energy ray (cobalt 60 machine) with a patient in position to receive rotational therapy.
Fig. 4 is an enlarged fragmentary view taken along the plane of line 4—4 of Fig. 3 and showing the means by which the circuit controlling switches are mounted on the head of the machine containing the radioactive materials which in turn is rotated about its mounting member.

Referring now to Fig. 3, it will be noted that the physician or operator of the apparatus first positions the patient 10, to be exposed to high energy rays, on a suitable cantilever table 11 which extends outwardly from a base 12 which is mounted on rollers and may be moved in any desired direction. The radiating head 13 of the machine is mounted for rotation on a substantially U-shaped frame member 14 which preferably has a radiation shield 15 mounted at its other end for rotation with head 13, or independently thereof. The U-shaped member is mounted for rotation about a pivot 18 mounted on the vertically upright portion 16 of a base 17. The patient is so positioned as to be located in substantial alignment with the axis of rotation of the U-shaped frame member 14. The operator then measures the distance to the area to be treated, a direction parallel to the passage of the high energy rays through the person and also takes into account the density of the medium to be traversed by the ray. Having thus located the exact area which is to be treated by the rays, it then is necessary to position this area directly in alignment with the center of rotation 18 of the U-shaped frame member 14. The U-shaped frame member 14 is then rotated about its axis by suitable driving means which in turn cause the radiating head 13 of the machine and its associated shield 15 to rotate about the patient in such a manner that the radiating rays continuously pass only through the area to be treated. This procedure is known as rotational therapy and it has the advantage of preventing serious ray burns such as were previously occasioned by passing the rays continuously through only one portion of the patient's body.

With rotational therapy, it will be readily appreciated that many areas and surrounding room walls will be exposed to the penetrating radiations emitted from such high energy ray machines. If no shield 15 is used, much of the radiation will strike the opposite wall. With shield 15, some scattered radiation will strike the opposite wall, but not enough to be dangerous.

Means are provided for recording and integrating the elapsed time that each area or wall has been exposed to said radiations in a given period. Said means automatically prevent further exposure to said particular area when such exposures excede a predetermined safe value. In other words, said means will automatically terminate and prevent further exposure when the maximum quantity of safe radiation has been applied to any area or wall of the room.

Figure 5:
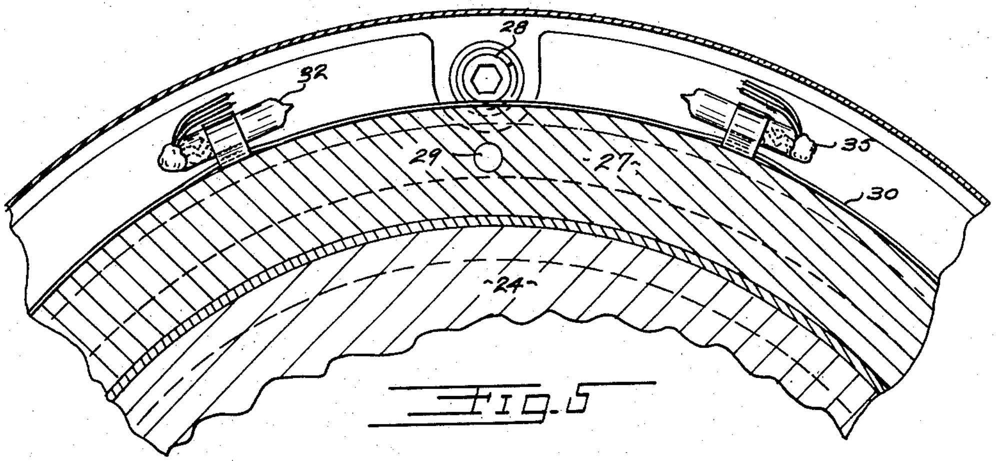
Fig. 5 is a vertical cross sectional view taken along the plane of line 5—5 of Fig. 4 showing the means by which the mercury switches are mounted on the head of the machine and revolve with said head about the head mounting.
Figure 6:
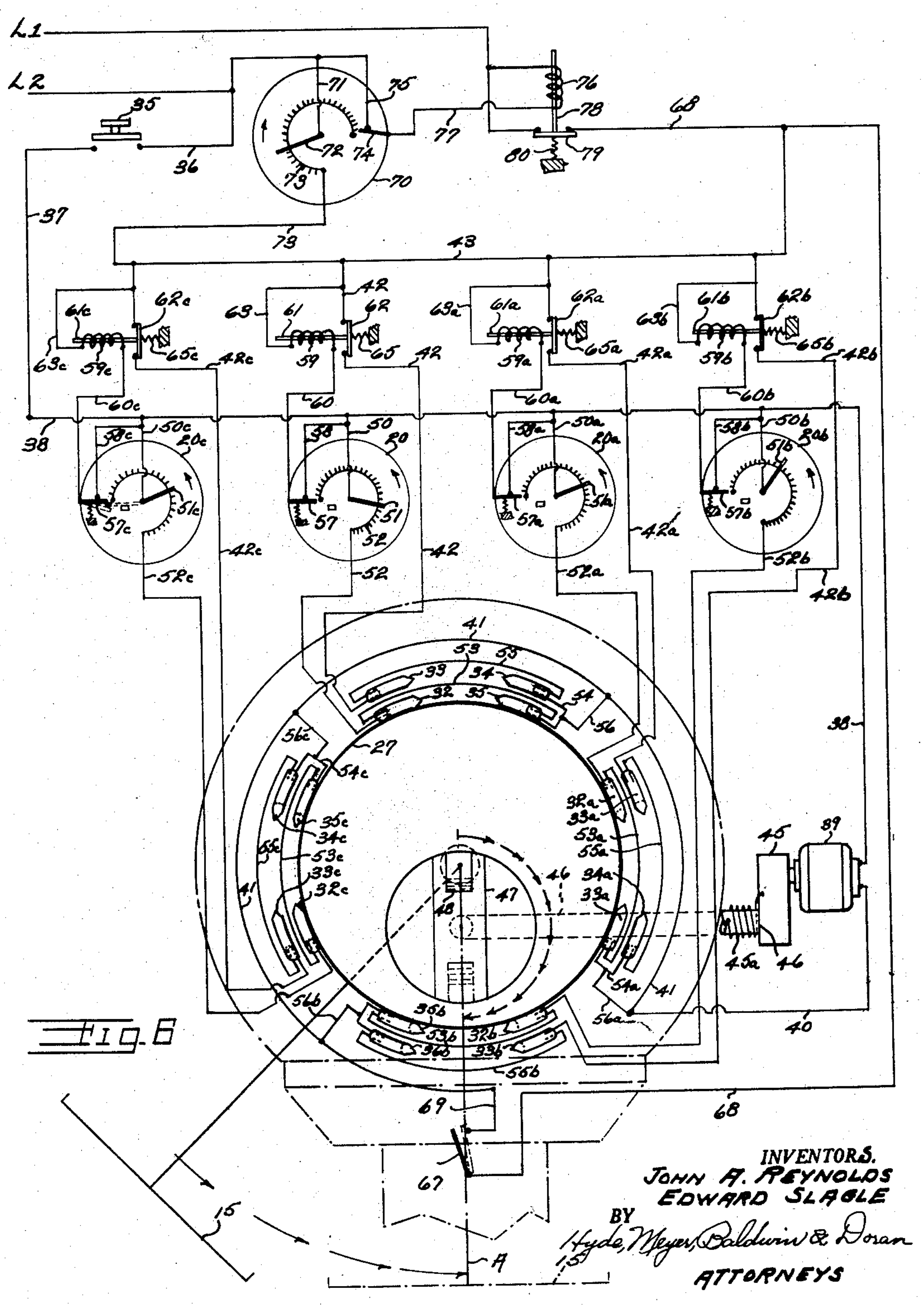
Fig. 6 is a schematic diagram of circuits for timing and controlling exposure to each wall of the room in which the present machine is located.

In the embodiment shown in Figs. 4, 5 and 6 the timing means consist of a plurality of timing clocks, here 20, **20*a*, 20*b* and 20*c*, as seen in Fig. 6, there being a separate clock for the ceiling, the floor, and each of two side walls toward which the rays will be directed. Each of the clocks is calibrated in minutes or hours and each of the clocks is individually switched into circuit (depending upon the direction in whch the radiating head of the machine is directed) and then individually integrate the total time periods of exposure directed to a given wall until a predetermined total is reached after which the clock timer disables a circuit hereinafter described which prevents the head 13 from being used when pointed in that particular direction unless use is made of the shield 15. It should be understood that each timer 20, 20*a*, 20*b*, 20*c* is electrically driven only when electrically energized, and when so energized each timer drives its associated arm 51, 51*a*, 51*b*, 51*c*, about approximately 270° from a starting position (at the "six-o'clock" position) counterclockwise to the finish position (at "nine o'clock"). It will be understood that the head 13** may be rotated through 360 degrees, thus exposing all of the walls falling in this path. As previously mentioned, the radiation from a high energy ray cobalt 60 machine is essentially constant and intensive, therefore, it becomes necessary to time only the exposure of each individual wall. Thus, it is only necessary to know the various angles of the head at which each wall will be exposed to the high energy rays from the head of the machine. Once the angle for a given wall is determined, a pair of switches may be disposed so as to define the given angle for a given wall and to control the individual timer for that wall. Since a mercury switch of the usual type only responds at the beginning of its sensing range, and then remains closed for about 180 degrees of rotation of the head (as used here) before it is again ready to deliver a signal, it becomes evident that such switches are the most practical to produce the desired results.

Referring to Figs. 3 and 4, it will be seen that head 13 is provided with a rearwardly extending neck **13*a*, which is provided with an upstanding flange 22. The head 13 and neck 13*a* are rotatably mounted on the end of U-shaped arm 14 by means of suitable bearings 23, as seen in Fig. 4. An inner race 24 is secured to the end of the U-shaped frame member 14 by means of bolts 25. The upper race is formed of an inner and outer race member 26 and 27, respectively. The upper inner race member 26 is secured to the upstanding flange 22 by means of bolts 28 and the upper outer race member 27 is secured to the upper inner race member 26 by means of bolts 29. Thus, the head 13 is capable of being rotated through 360 degrees at the end of frame member 14. The upper and radially outer surface 27*a* of upper outer race member 27 is substantially flat axially and has provided thereon a pair of spaced parallel rings 30 and 31 which extend completely around the radially outer circumference of the race member 27. A plurality of mercury switches 32 and 33 are secured to the outer surface 27*a* of said upper outer race member 27 by means of said spaced rings 30 and 31 respectively. As seen in Fig. 5, the mercury switches are held by band 30 to the outer circumference of the member 27** and may be suitably adjusted to any desired position and at any desired spacing.

Referring now to Fig. 6, we have shown a schematic view of a plurality of mercury switches disposed about the circumference of the member 27. It should be noted that this arrangement requires a set of two pairs of switches to define a given wall. A total of four sets of switches are here used, therefore the present embodiment is adapted to be responsive to a total of four walls.

As seen in Fig. 6, each set of switches is connected to a respective timing clock by suitable circuitry. The lower portion of Fig. 6 shows the position of the switches when the head is in the position of Fig. 3. Only the set of switches comprising pairs 32, 33 and 34, 35, as seen in Fig. 6, are closed due to the design of the mercury switches which are of normal type and respond or close the circuit in the present embodiment when located in approximately the upper quarter position, as herein shown. The switch contacts are at the blunt end of the switch housing so that contacts are closed only when the mass of mercury is at that end. It will be understood that each set of switches rotates with the head 13 and as each set of switches reaches the position of switches 32, 33 and 34, 35, (at the top of the circle) they are closed and thereby energize a circuit through their individual timing clocks during that period of time in which the head 13 emits rays toward the corresponding wall, or in other words, a circuit is completed therethrough. As the head 13 is rotated to a new position from the Fig. 6 position, another set of switches is brought into the responsive area and the switches 32, 33 and 34, 35 move out of the responsive area as seen in Fig. 6 and are then opened so as to deenergize the circuit through the responsive timer clock 20.

Since each of the circuits incorporating clocks 20, **20*a*, 20*b* and 20*c*** and their associate set of mercury switches are identical, only one such circuit will be described in detail and the remaining three circuits will incorporate the same numbers with the suffix *a*, *b* and *c* respectively, added thereafter. Referring again to Fig. 6, it will be seen that the circuit is connected to a customary commercial source of supply L1 and L2. Depression of the push button switch 35 will cause a circuit extending from supply L2 through lines 36, 37 and 38 to motor 39. The circuit through motor 39 is completed by a line 40 which is connected to a line 41 which in turn connects each of the respective sets of mercury switches. The circuit continues through whichever set of switches is in a closed position; switches 32, 33, and 34, 35 as shown in Fig. 6, are in such closed position and the circuit would be completed therethrough, thence through line 42, contact closer 62, lines 43 and 68, and contact closer 79 back to main power supply line L1. The motor 39 is connected by suitable gearing contained in housing 45 to a drive shaft 46 which is in driving engagement with a cylinder 47 of lead, tungsten alloy or other heavy metal which is completely encased in the head 13. This unit is mounted for rotation in head 13 and in one end thereof are mounted a plurality of disks 48 of cobalt 60. In order for the radiation of the cobalt 60 to emerge from the head 13, the cylinder 47 must be rotated into an open position as shown in dotted lines in Fig. 6 wherein the cobalt source is open to an aperture provided in register with a collimator 49 at the lower end of head 13, as seen in Fig. 3. Thus, in order to operate the machine, the operator must first energize motor 39 so that it will rotate the cylinder 47 into a position wherein the rays emitted from the cobalt 60 may pass outwardly through the collimator means. Motor 39 has a known control (not shown) so that it rotates cylinder 47 through 180° and then stops. This winds up coil spring 45a just enough to return cylinder 47 through 180° when motor 39 is deenergized. Spring 45a has one end attached to shaft 46 and the other end fixed. In order for the motor 39 to be operative, however, it must complete its circuit through one of the timing clocks 20, 20a, 20b or 20c. If, however, the total exposure time of one of these clocks has been exhausted, then the circuit may not be completed through said clocks for the reasons hereinafter described since the clock upon having its time increment exhausted will break its circuit. When the head is in a rotational position, wherein the switches of an exhausted clock are closed the motor may still not be energized since the timer has broken its circuit and therefore the cylinder 47 will not be rotated from an "off" to an "on" position.

The circuit of clock timer 20 is formed through inlet power line L2 by means of line 36, switch 35, line 37, line 38 and line 50 which has direct contact with contactor arm 51. The contact arm 51 also functions to show the exposure time elapsed for the area to which it is responsive. The circuit through timer clock 20 includes line 52, mercury switch 32, line 53, mercury switch 35, line 54, mercury switch 34, line 55, mercury switch 33, line 42 which is connected to supply line L1 by lines 43 and 68. Thus, when head 13 is in the position as defined by the location of the mercury switches 32, 33 and 34, 35 as shown in Fig. 6, upon closing switch 35, a circuit is completed through switch 35, line 37, line 38 to motor 39, thence through line 40, line 41 to mercury switches 34 and 33 by means of line 56, 54 and 55, thence to power line L1 via lines 42 and 43.

In order to render the circuit through the timing clock 20 inoperative after the total exposure time has run out on the clock, an additional circuit is provided. This additional circuit includes normally closed switch 57 which is connected to line 50 by means of line 58 and to an electromagnetic winding 59 of a solenoid by means of line 60. The solenoid is designed to actuate an armature 61 carrying a bridging or contact closing member 62 in line 42. The other terminal of the electromagnetic winding 59 is connected by means of line 63 to line 42, thence to line 43 and power line L1. In normal operation and while exposure time still remains on clock timer 20 current flows through switch 57 and the electromagnetic winding of the solenoid which is energized thereby and retains armature 61 and its bridging contact 62 in a circuit closing position. After expiration of the time period set by the clock timer 20, the circuit to the circuit breaker 62 is interrupted by contact arm 51 opening switch 57, it being understood that the engagement between arm 51 and switch 57 is through an insulating end on switch blade 57. This deenergizes the electromagnetic coil 59 and causes its contacts 62 to open due to the tension exerted thereon by coil spring 65. Having broken the circuit through line 42, a circuit through the mercury switches 32, 33 and 34, 35 from line 40 of motor 39 cannot be completed; therefore, motor 39 cannot operate. It will be remembered that in the position shown in Fig. 6 only the set of mercury switches 32, 33 and 34, 35 are closed. The remaining sets of mercury switches are still open; therefore, a circuit, if it is to be completed, must be through the set of mercury switches 32, 33 and 34, 35, upon exhaustion of the total exposure time in the timing clock 20. In other words, the circuit through line 42 is automatically broken and the circuit through motor 39 therefore cannot be closed while the head 13 is directed in such a position wherein the set mercury switches 32, 33 and 34, 35 are in the position shown in Fig. 16.

If the head 13 is rotated into another position, then a different set of mercury switches will be brought into the position of mercury switches 32, 33 and 34, 35 and one of the other clock timers 20a, 20b or 20c and their associated circuits brought into play.

Even though the total exposure time of clock timer 20 has expired and the electromagnetic coil 59 of the solenoid has caused the return circuit through line 42 to be broken, additional safety means are provided for operating the head while it remains in the position shown in Fig. 6, wherein only the mercury switches 32, 33, 34 and 35 are closed. Such additional safety means comprise a radiation shield 15 which is so constructed that it is independently rotatable about the central axis 18 of U-shaped frame member 14 and is connected to a switch 67 which in turn has one of its contacts connected by means of line 68 to power supply line L1 and the other of its contacts connected by means of line 69 to line 41 which by-passes the sets of mercury switches and is connected to line 40 which is connected to the motor 39. Thus, if the radiation shield 15 is so positioned that the head 13 is pointing at the radiation shield, then switch 67 will be closed and the motor may be operated by closing switch 35 which completes the circuit through lines 36, 37 and 38 to one of the motor contacts, the circuit being completed through the remaining motor contact via lines 40, 41, 69, switch 67 and conductor 68 to the supply line L1.

In addition to the clock timers 20, 20a, 20b and 20c, a continuous operating clock timer 70 is also provided. Whereas the timers 20, 20a, 20b and 20c are normally calibrated in hours, the continuously operating timer 70 is calibrated in days and preferably for a total period of a week. Timer 70 is electrically operated only when energized and then drives arm 72 from a start at the "six o'clock" position clockwise to a finish at the "three o'clock" position. The timer 70 includes a normally closed circuit which extends from power inlet L2 via conductor 71 which is connected to contact arm 72 of the continuous clock timer 70. Line 73 completes the circuit and is connected to line 43 which in turn leads into line L1 via conductor 68. Upon expiration of the total time calibrated on the continuous timer 70, means are provided for opening the entire circuit including the clock timers 20, 20a, 20b and 20c, thereby rendering the machine inoperative until each of the timers has been reset to its initial position. Such means take the form of switch 74 which is associated with the continuous timer 70 and has one of its contacts connected to line 71 by means of line 75 and the other of its contacts connected by line 77 to a solenoid or electromagnetic winding 76 which is designed to actuate an armature 78 carrying a bridging or contact closing member 79 in line 68. In normal operation, switch 74 remains closed and the solenoid winding 76 is continuously energized so that the contact closing member 79 remains in a circuit closing position as shown in Fig. 6. Upon the expiration, however, of the total time calibrated on the continuous timer 70, contact arm 72 engages the switch 74 so as to open said switch (through insulating engagement parts) and thereby break the circuit and deenergize electromagnetic winding 76 which permits a coil spring 80 to break the circuit by opening contact closing member 79 in line 68. It will be understood that once the circuit through line 68 is broken, it is impossible to operate either the motor 39 or to complete circuits through any of the timers 20, 20*a*, 20*b* or 20*c*. At the end of a week, if such is the calibrated time on the continuous timer 70, operation of the machine will be impossible and it will be obvious to the operator that it is now time to reset timer 70 and each of the timers 20, 20*a*, 20*b* and 20*c* to their initial positions. Resetting of the timer 70 again automatically permits the switch 74 to be closed and thereby energizes the electromagnetic coil 76 which causes the contact closing member 79 to return to its circuit closing position, as seen in Fig. 6. It will be understood, however, that the clock timers 20, 20*a*, 20*b* and 20*c* may not be reset until the continuous or weekly clock timer 70 has expired. Suitable container means not herein shown may be provided to prevent access to the timer clocks 20, 20*a*, 20*b* and 20*c* until the weekly timer 70 has thus consumed its calibrated time. This could include electric locks on cases enclosing the clocks, which locks are released only when switch 74 is opened. After the consumption of all the time calibrated on the weekly timer 70, the container doors wherein clock timers 20, 20*a*, 20*b* and 20*c* are contained will be automatically released for access thereto to permit resetting of each of the timers.

It will be understood, of course, that if some of the walls do not have adequate protection for the direct radiation for any sensible duration of time per week, the clock and associated switches and circuit breakers referring to that wall would just be deleted from the circuit and the machine could not be operated unless the radiation shield 15 was positioned to intercept the radiations from the machine. It is, of course, assumed that the radiation shield is of sufficient thickness to attenuate the direct beam for radiation below the level of scattered radiation present. Furthermore, if some walls have more than sufficient protection for the direct radiation (for example, a floor built upon the earth) then the clock and associated circuit breaker mechanism referring to that wall would be deleted from the circuit and the mercury switches alone would be sufficient.

Figures 7, 8:
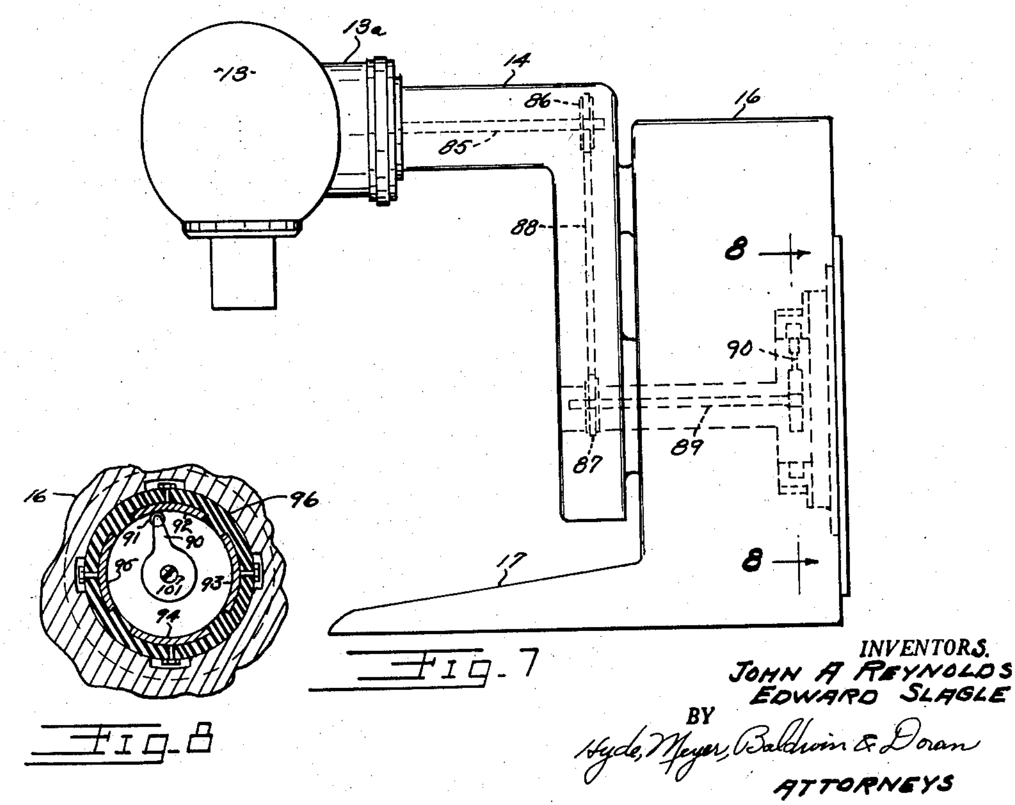
Fig. 7 is a side elevational view of a modified embodiment of the present invention in which the contacts other than mercury switches are used to control the circuits disclosed in Fig. 6.
Fig. 8 is a fragmentary view taken along the plane of line 8—8 of Fig. 7 showing the detailed construction of the embodiment disclosed therein.

Referring now to Figs. 7 and 8 wherein I have shown another embodiment of the present invention, which is designed to eliminate the necessity of the mercury switches heretofore described. Referring to Fig. 7, a sprocket wheel, not shown, is fixed upon the head 13 and is connected by means of drive shaft 85 to a pulley 86 which in turn is connected to pulley 87 by means of a continuous chain 88 which in turn drives shaft 89 and rotor contact member 90. The rotor has a cam follower 91 which contacts a plurality of limit switches 92, 93, 94 and 95 which are disposed about the inner periphery of a hub member 96, as seen in Fig. 8. The rotor 90 is responsive to any rotational movement of the head 13 and by properly positioning the limit switches 92, 93, 94 and 95, the same sensing function as the mercury switches previously used may be accomplished. It will be understood that the limit switches are connected to a suitable electrical circuit and timing means in a manner similar to that of the mercury switches, shown in Fig. 6.

Figure 9:
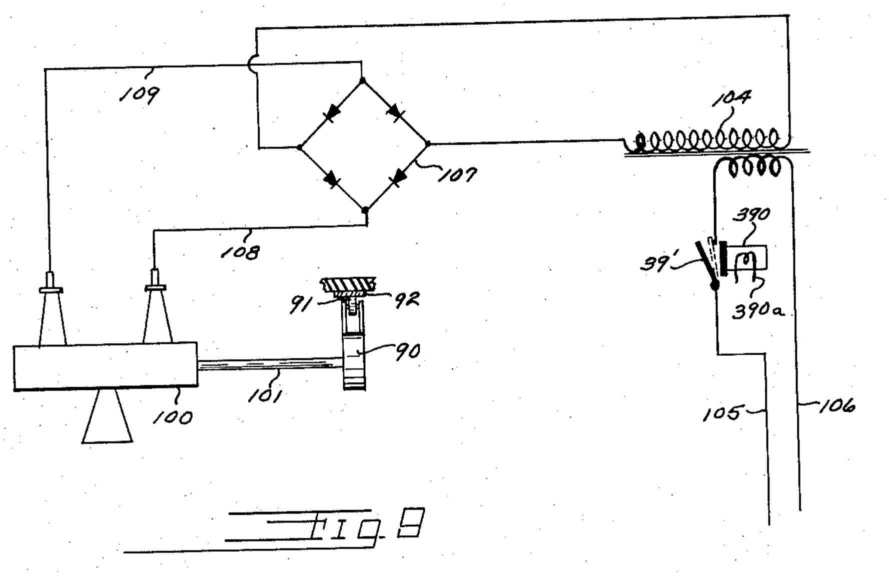
Fig. 9 is a schematic diagram of an X-ray tube and its associated control circuit coupled with the type of switches as disclosed in Fig. 8 of the drawings, for carrying out the present invention.

Referring now to Fig. 9 wherein we have substituted in place of the cobalt 60 head a standard Roentgen or X-ray tube 100 which is connected by means of a drive shaft 101 to a switch arrangement, as shown in Fig. 8, comprising the rotor contact member 90, cam follower 91 and a plurality of limit switches 92, 93, 94 and 95 which are disposed about the inner periphery of the insulating hub 96 and are adapted to be contacted by cam follower 91 in a manner identical to that shown in Fig. 8. The rotor 90 is responsive through shaft 101, to any rotational movement of the Roentgen tube 100 and by properly positioning the limit switches 92, 93, 94 and 95, the same sensing function as provided by the mercury switches previously used is accomplished. In other words, the contacts 92, 93, 94 and 95 respectively are in control when the rays from tube 100 are directed to each of the four walls of the room. It will be understood that the limit switches such as 92 are connected to identical electrical circuits and timing means, as shown in Fig. 6. Each of these contacts takes the place of a set of mercury switches (such as 32, 33, 34, 35) in the diagram of Fig. 6. The X-ray or Roentgen tube 100 is of any suitable construction and is connected for energization to the secondary of a conventional transformer 104. A starting switch 39′ is provided in one of the power supply lines 105 or 106 of the primary of transformer 104. When the switch 39′ is closed, the transformer 104 becomes energized and causes the Roentgen tube 100 to be energized through a suitable rectifier 107 via lines 108 and 109. This switch 39′ is normally open and is closed by energization of solenoid 390 when its winding 390*a* is energized. Winding 390*a* takes the place of motor 39 in the diagram of Fig. 6.

It will be understood that a control circuit identical to that disclosed in Fig. 6 will be used in connection with the present embodiment, except in place of the motor 39 in Fig. 6 there is substituted switch 39′ which enables energization of the X-ray tube only under the same conditions as motor 39 is energized in the above description. Also, line 68, 43, 42*a*, 42*b*, 42*c*, 42*d* in parallel is connected to conductive contactor 91, and lines 52, 52*a*, 52*c*, 52*d* connected respectively to contacts 92, 93, 94 and 95.

It is believed that a brief explanation of some of the terms used in the broader claims may prove to be helpful. The term "high energy ray source" refers to the cobalt 60 head 13 as well as to the X-ray or Roentgen tube 100. The term "means normally enabling this source" refers to the motor 39 which will rotate a radium containing cylinder 47 around to a ray emitting position where it is in alignment with the open passageway of the collimator in the head 13. Such "means" also refers to the switch 39′ and its solenoid which, upon being closed, causes energization of the X-ray or Roentgen tube 100. The term "means responsive to operation of said timer for causing actuation of said secondary means to said disabling condition" has reference to the coil spring 45*a* of Fig. 6, and to the opening of normally open switch 39′ in Fig. 9 when solenoid 390 is deenergized.

It will be understood that the present device is operative if the total elapsed exposure time comprises one continuous exposure or a plurality of small, incremental exposures.

In view of the foregoing description, taken in conjunction with the accompanying drawings, it is believed that a clear understanding of the construction, operation and advantages of the device will be quite apparent to those skilled in this art.

Having thus described our invention and illustrated its use, what we claim as new and desire to secure by Letters Patent is:

1. A safety device for controlling total permissible radiation in a predetermined direction from a beam of rays from a high energy ray source comprising a timer, means energizing said timer responsive to directing said beam of rays in said predetermined direction, said means being actuatable to energize said timer independently of said beam of rays, means normally enabling said source and actuatable to a disabling condition, and means responsive to operation of said timer for causing actuation of said second-named means to said disabling condition.

2. A radiation time recording and control apparatus comprising in combination a high energy ray head, a normally rotatable annular member, means connecting said head in driving engagement with said annular member, a plurality of pairs of switches disposed circumferentially about said annular member, each pair of said switches defining an angular segment of the entire circular path through which said head may be rotated, container means in said head having therein a high energy ray emitting substance, driving means including an electric motor for moving said container means within said head into ray emitting position, a timer for each pair of said switches, each of said timers adapted to have the cumulative time increments consumed recorded thereon while said head radiates in the angular direction defined by said timer's associated pair of switches, means for disabling said driving means responsive to running out of said timer, a circuit betwen each of said pairs of switches and their respecive timer, each of said circuits being connected in parallel with a power supply, another circuit including said electric motor arranged in series with said parallel circuits and being energized upon the running of one of said timers in response to the disposition of said head in the direction to which said timer is responsive.

3. The combination of claim 2 wherein each of said parallel circuits is provided with a circuit breaker, each of said circuit breakers being responsive to the running out of said timer.

4. A radiation time recording and control apparatus comprising in combination a high energy ray head, a normally rotatable annular member, means connecting said head in driving engagement with said annular member, a plurality of pairs of switches disposed circumferentially about said annular member, each pair of said switches defining an angular segment of the entire circular path through which said head may be rotated, said head having therein a high energy ray emitting substance, means normally enabling radiation from said head and actuatable to a disabling condition, a timer for each pair of said switches adapted to have the time increments recorded thereon progressively consumed while said head radiates in the direction defined by a particular pair of switches and timed by their associated timer, a circuit between each of said pairs of switches and their associated timer, each of said circuits being connected in parallel with a power supply, said circuits being individually energized in response to the disposition of said head in the direction defined by their respective switches and timers, and means responsive to operation of said timer for causing actuation of said enabling means to disabling condition.

5. A radiation time recording and control apparatus comprising in combination a high energy ray head, means supporting a plurality of switches in circumferential disposition, each of said switches defining an angular segment of the entire circular path through which said head may be rotated, means selectively actuating said switches in response to rotation of said head, container means in said head having therein a high energy ray emitting substance, driving means including an electric motor for moving said container means into ray emitting position, a timer for each of said switches, each of said timers adapted to have the cumulative time increments consumed recorded thereon while said head radiates in the angular direction defined by said timer and its associated switch, means for disabling said driving means responsive to running out of said timer, a circuit between each of said switches and their respective timer, each of said circuits being connected in parallel with a power supply, another circuit including said electric motor arranged in series with said parallel circuits and being energized upon the running of one of said timers in response to the disposition of said head in the direction to which said timer is responsive.

6. The combination of claim 5 wherein each of said parallel circuits is provided with a circuit breaker, each of said circuit breakers being responsive to exhaustion of said time increment recorded on the timer after maximum permissible radiation in a particular direction.

7. A radiation time recording and control apparatus comprising in combination a high energy ray head, a normally rotatable annular member, means connecting said head in driving engagement with said annular member, switch means disposed circumferentially about said annular member, said switch means defining angular segments of the entire circular path through which said head may be rotated, container means in said head having therein a high energy ray emitting substance, driving means for moving said container means into ray emitting position, timer means associated with said switch means adapted to have the cumulative time increments recorded thereon while said head radiates in the particular angular direction defined by said timer means and associated switch means, circuit means between each of said switch means and its associated timer means, said circuit means being connected with a power supply, another circuit including said driving means arranged in series with said first named circuit means and being energized upon the running of said timer means in response to the disposition of said head in the direction defined by said timer means and associated switch means, and means for disabling said driving means responsive to running out of said timer.

8. The combination of claim 7 wherein said circuit means between each of said switch means and timer means is provided with a circuit breaker, each of said circuit breakers being responsive to exhaustion of said time increment recorded on said timer means after maximum permissible radiation in a particular direction.

9. A safety device for controlling total permissible radiation in a predetermined direction from a high energy ray source, a rotor operatively connected to said source, means supporting a plurality of switches circumferentially about said rotor, said rotor actuating said switches upon contact therewith, each of said switches defining an angular segment of the entire circular path of travel of said source, means normally enabling said source and actuatable to a disabling condition, a timer for each of said switches adapted to have the time increments recorded thereon progressively consumed while said source radiates in the angular direction defined by said timer's associated switch, a circuit between each of said switches and their associated timer, and means for disabling said second named means responsive to running out of said timer.

10. A safety device for controlling total permissible radiation in a predetermined direction from a beam of rays from a high energy ray source comprising a normally rotatable annular member, a plurality of pairs of mercury switches disposed about said annular member, each pair of switches on said annular member lying on opposite sides of a vertical plane when said beam is directed toward a selected wall of a room, and in this operative position the mercury in said operative pair of switches being in a circuit closing position, means actuating said annular member in response to rotation of said source, each pair of said switches defining an angular segment of the entire circular path through which said source may be revolved, a timer for each pair of said switches adapted to have the cumulative time increments consumed recorded thereon while said source radiates in the predetermined direction defined by said timer's associated pair of switches, means normally enabling said source and actuatable to a disabling condition, a circuit between each of said pairs of switches and their associated timer, each of said circuits being connected in parallel with a power supply, said circuits being individually energized in response to the disposition of said source in the predetermined direction defined by their respective switches and timers, and means responsive to operation of said timer for causing actuation of said enabling means to said disabling condition.

11. A safety device for controlling total permissible radiation in a predetermined direction from a beam of rays from a high energy ray source comprising a normally rotatable annular member, a plurality of pairs of switches disposed circumferentially about said annular member, each of said switches being a mercury switch, a pair of switches on said annular member lying radially opposite the beam emitting opening of said high energy ray source and substantially equally spaced on opposite sides of the main beam axis and in this operative position the mercury in said pair of switches being in a circuit closing position, means actuating said annular member in response to rotation of said source, each pair of said switches defining an angular segment of the entire circular path through which said source may be revolved, means normally enabling said source and actuatable to a disabling condition, a timer for each pair of said switches adapted to have the cumulative time increments consumed recorded thereon while said source radiates in the predetermined direction defined by said timer's associated pair of switches, a circuit between each of said pairs of switches and their associated timer, each of said circuits being connected in parallel with a power supply, said circuits being individually energized in response to the disposition of said source in the predetermined direction defined by their respective switches and timers, and means responsive to operation of said timer for causing actuation of said enabling means to said disabling condition.

12. A safety device for controlling total permissible radiation in a predetermined direction from a beam of rays from a high energy ray source comprising a normally rotatable annular member, a plurality of pairs of switches disposed circumferentially about said annular member, each of said switches being a mercury switch, each of said mercury switches having a switch opening end and a switch closing end, said switch closing ends being disposed toward each other in each pair of said switches, means actuating said annular member in response to rotation of said source, each pair of said switches defining an angular segment of the entire circular path through which said source may be revolved, means normally enabling said source and actuatable to a disabling condition, a timer for each pair of said switches adapted to have the cumulative time increments consumed recorded thereon while said source radiates in the predetermined direction defined by said timer's associated pair of switches, a circuit between each of said pairs of switches and their associated timer, each of said circuits being connected in parallel with a power supply, said circuits being individually energized in response to the disposition of said source in the predetermined direction defined by their respective switches and timers, and means responsive to operation of said timer for causing actuation of said enabling means to said enabling condition.

13. A safety device for controlling total permissible radiation in a predetermined direction from a beam of rays from a high energy ray source comprising means pivotally mounting said ray source in such manner as to direct its rays in a plane substantially at right angles to said means, a movable electrical contact rotatable corresponding with said source, a plurality of contacts fixed about a circle for selective contact by said rotatable contact, a timer in circuit with each of said fixed contacts, energizing means for said timer effective to energize the same in response to directing said beam of rays in said predetermined direction, means normally enabling said source and actuatable to a disabling condition, said enabling means including an electrical circuit selectively connected with each of said timers in response to directing said source in said predetermined direction.

References Cited in the file of this patent

UNITED STATES PATENTS

| | | |
|---|---|---|
| 2,747,104 | Jacobs | May 22, 1956 |
| 2,781,454 | Green et al. | Feb. 12, 1957 |